United States Patent [19]
Atwater et al.

[11] 4,232,932
[45] Nov. 11, 1980

[54] KALEIDOSCOPIC TOY

[76] Inventors: Stephen K. Atwater, 2216 Stand; Joseph Wolfson, 224 23rd Pl., both of Manhatten Beach, Calif. 90266

[21] Appl. No.: 32,393

[22] Filed: Apr. 23, 1979

[51] Int. Cl.³ .............................................. G02B 23/00
[52] U.S. Cl. ..................................................... 350/4.1
[58] Field of Search ............................. 350/4.1; 353/1

[56] References Cited

U.S. PATENT DOCUMENTS

| | | | |
|---|---|---|---|
| 3,482,896 | 12/1969 | Bogosian | 350/4.1 |
| 3,930,711 | 1/1976 | Powell | 350/4.1 |
| 4,061,414 | 12/1977 | Price | 350/4.1 |

*Primary Examiner*—Richard A. Wintercorn
*Attorney, Agent, or Firm*—W. Edward Johansen

[57] ABSTRACT

The present invention is an improved kaleidoscopic toy which has no moving parts and which provides a plurality of reproduceable optical shapes and patterns. The improved kaleidoscopic toy is a cube having six inner sidewalls, each of which has a mirrored surface with a plurality of transparent areas which are of a variety of shapes and which are colored with a stain glass paint of any one of a variety of colors. The cube is formed from six identical flat, square-shaped pieces of a transparent material, either plastic or glass. A first layer of mirror backing paint is applied to the outer sidewall of each of the six identical flat, square-shaped pieces and is interrupted only by the plurality of transparent areas of the mirrored surface. A second layer of dark paint is applied over the first layer. The transparent areas of the mirrored surface are formed by using a variety of cut-out shapes as masks when the layer of mirror backing paint is placed on the outer sidewalls of the cube. A layer of stain glass paint is applied to these transparent areas. The improved kaleidoscopic toy also includes a plurality of circular transparent areas in the corners of at least two of the six inner sidewalls in order for a person to view the mirrored surface and to experience the multi-colored optical shapes and patterns of the kaleidoscopic toy.

6 Claims, 4 Drawing Figures

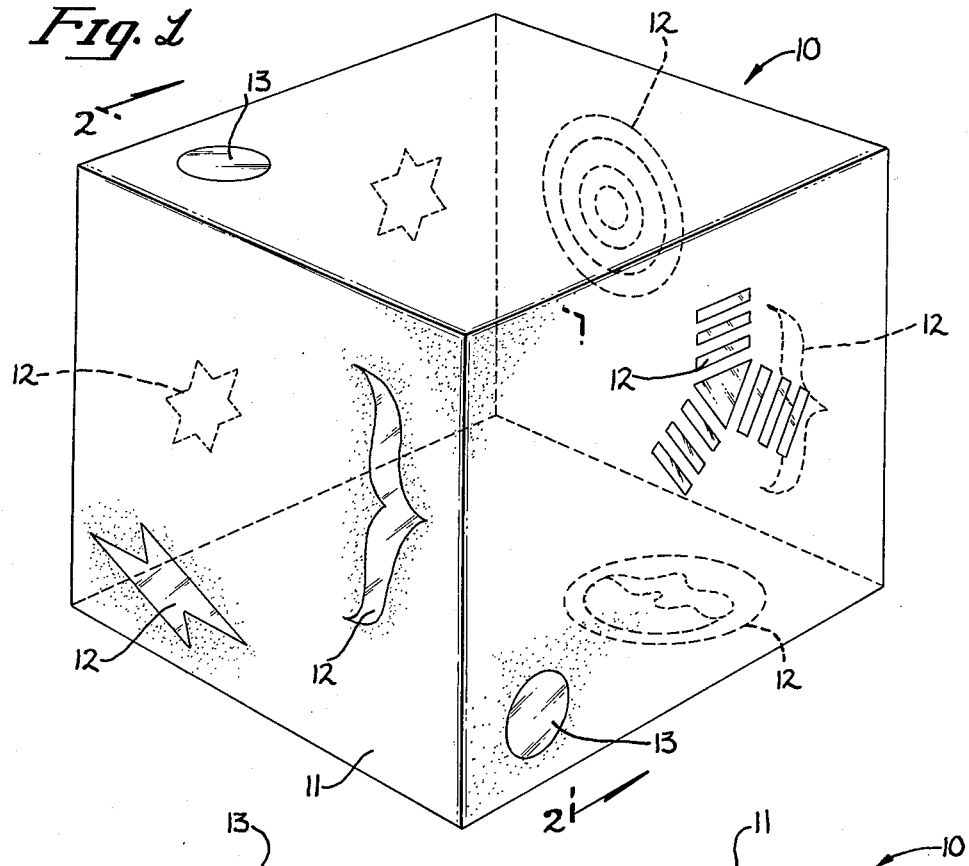
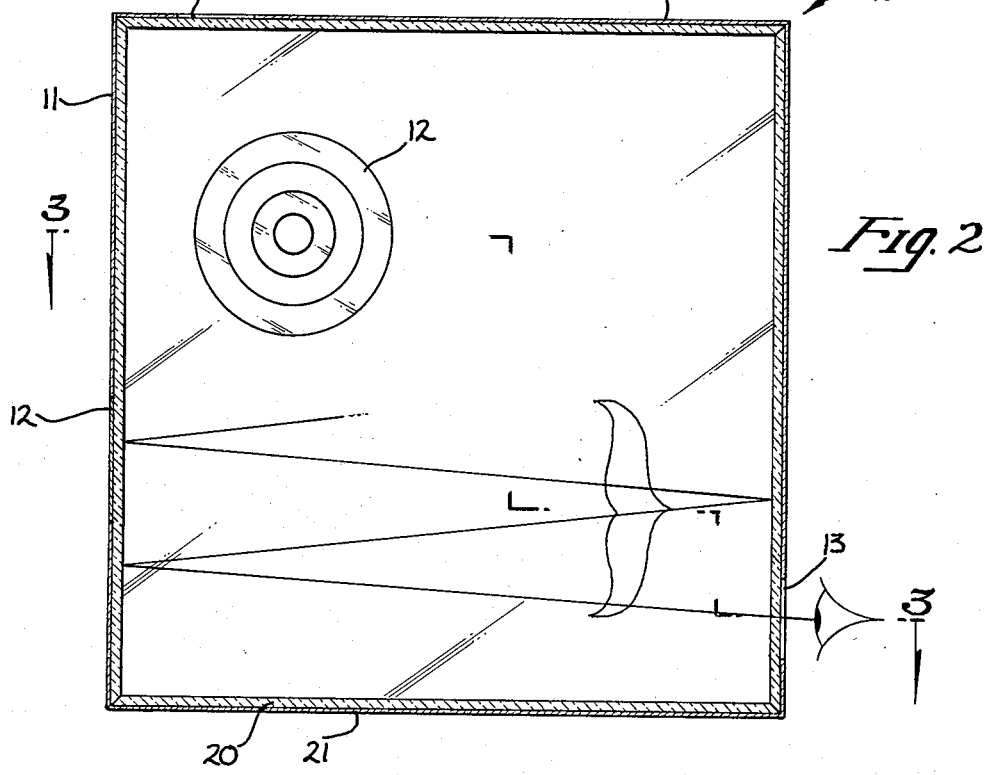

KALEIDOSCOPIC TOY

BACKGROUND OF THE INVENTION

1. Field of the Invention

The present invention relates to a kaleidoscopic toy and more particularly to a kaleidoscopic toy which, although it has no moving parts, is able to provide a plurality of optical effects.

2. Description of the Prior Art

U.S. Pat. No. 407,937, entitled Kaleidoscope, issued to Joseph W. Lovibond on July 30, 1889, teaches the combination, with a kaleidoscope, of two or more disks placed in front of one another and independently movable by rolling, as described, in the field of view of the instrument, one or more of the disks being translucent and party-colored or made of differently-colored segments united together to form a solid disk, and one or more of the disks being opaque with through-apertures, as and for the purpose specified.

U.S. Pat. No. 3,383,150, entitled Kaleidoscopic Viewing Device, issued to Edgar A. Powers on May 14, 1968, teaches a kaleidoscopic viewing device which includes an elongated cylindrical tubular body member, an eyepiece secured to one end of the body member, an axially disposed sight opening in the eyepiece, an object enclosure secured to the other end of the body member, a multiplicity of pattern producing objects disposed within the object enclosure, and a handle by which the device is adapted to be held during use secured to the body member. The object enclosure includes a hermetically sealed hollow globe of greater diameter than the diameter of the body member which is formed of transparent material and is substantially filled with a clear transparent liquid. The pattern producing objects include a variety of glittering particles of matter which vary as to size, shape, color and density from glittering powders of microscopic size to conventional sized objects of varying compositions and contrasting specific gravity whereby some of the objects will gradually sink in said liquid, and others will rise in the liquid and float thereon and others will remain suspended in the liquid.

U.S. Pat. No. 4,120,116, entitled Optical Toy, issued to Guy Williams on Oct. 17, 1978, teaches a toy which includes a circular tubular member with a mirrored inner surface. The tubular member contains a transparent sphere rollable through the interior of the tubular member. The tubular member has a retainer on each end for preventing the sphere from passing from the tubular member. The retainer forms an eyepiece to permit viewing and has a prismatic refraction device positioned over the outer end of the tubular member.

Other patents which teach kaleidoscopic devices include U.S. Pat. No. 3,242,799, U.S. Pat. No. 3,237,512 and U.S. Pat. No. 984,198.

The kaleidoscopic devices of the prior art provide an infinite variety of optical shapes and patterns none of which are reproduceable.

SUMMARY OF THE INVENTION

In view of the foregoing factors and conditions characteristic of the prior art it is a primary object of the present invention to provide an improved kaleidoscopic toy which provides a plurality of reproduceable optical shapes and patterns.

It is another object of the present invention to provide an improved kaleidoscopic toy which can be manufactured in a variety of sizes and which can be adapted to have six optical shapes and patterns chosen from an infinite plurality of optical shapes and patterns.

It is still another object of the present invention to provide a kaleidoscopic toy which can be formed from plastic which is not only easy to manufacture, but which also makes it safe for children to play with kaleidoscopic toy.

In accordance with an embodiment of the present invention, an improved kaleidoscopic toy in the shape of a cube is described. The kaleidoscopic toy which has no moving parts and which provides a plurality of reproduceable optical shapes and patterns. The improved kaleidoscopic toy is a cube having six inner sidewalls, each of which has a mirrored surface with a plurality of transparent areas which are of a variety of shapes and which are colored with a stain glass paint of any one of a variety of colors. The cube is formed from six identical, flat, square-shaped pieces of a transparent material, either plastic or glass. A layer of mirror backing paint is applied to the outer sidewall of each of the six identical flat, square-shaped pieces and is interrupted only by the plurality of transparent areas of the mirrored surface. A layer of stain glass paint is applied to these transparent areas. The transparent areas of the mirrored surface is formed by using a variety of cut-out shapes as masks when the layer of mirror backing paint is placed on the outer sidewalls of the cube. The improved kaleidoscopic toy also includes a plurality of circular transparent areas in the corners of at least two of the six inner sidewalls in order for a person to view the mirrored surface and to experience the multi-colored optical shapes and patterns of the kaleidoscopic toy.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a perspective drawing of a kaleidoscopic toy which has been constructed in accordance with the principles of the present invention.

FIG. 2 is a side elevational, cross-sectional view of the kaleidoscopic toy of FIG. 1 taken along line 2—2 of FIG. 1.

DESCRIPTION OF THE PREFERRED EMBODIMENT

Figure 3:
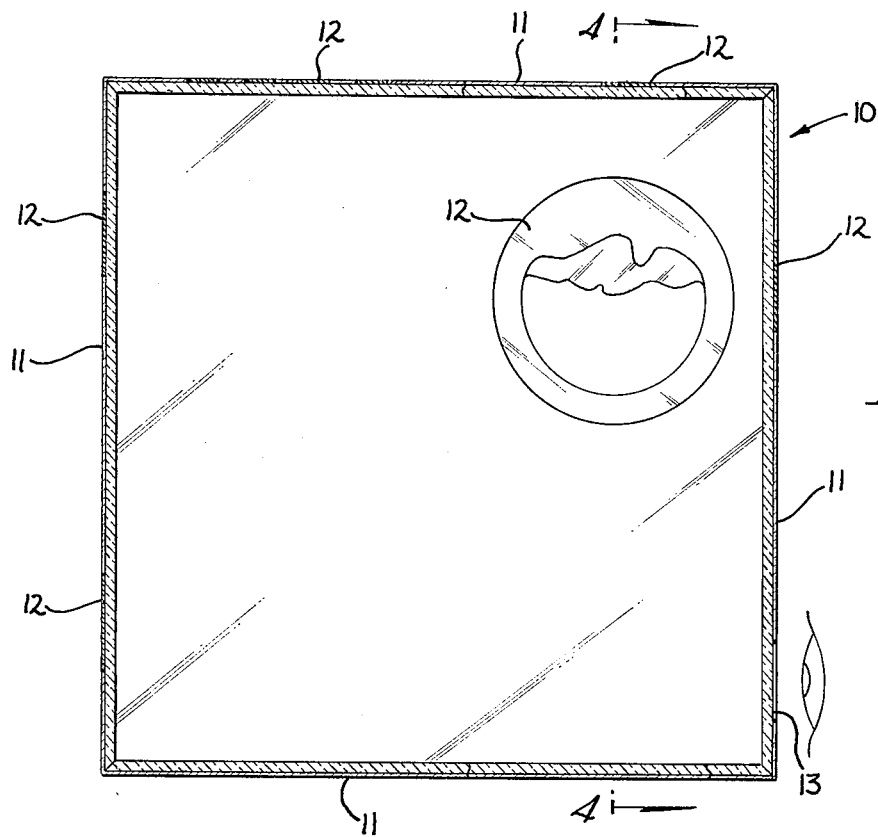
FIG. 3 is a top cross-sectional view of the kaleidoscopic toy of FIG. 1 taken along line 3—3 of FIG. 2.

In order to best understand the present invention it is necessary to review the following description of its preferred embodiment in conjunction with the accompanying drawing. The preferred embodiment of the improved kaleidoscopic toy 10 as shown in FIG. 1 is a cube which has six sidewalls 11. Each sidewall 11 has an inner mirrored surface interrupted only by a plurality of transparent areas, some of which are coated with a stain glass paint and the others of which are left transparent in order that one may view the inner mirrored surfaces. The stained-transparent areas are of a variety of shapes 12 which provide a plurality of reproduceable multicolored optical shapes and patterns. The unstained transparent areas are used as a viewing window 13.

Referring to FIG. 2 in conjunction with FIG. 1 each sidewall 11 is formed from a transparent material, either glass or plastic, in the shape of a flat, square-shaped member. A mask, which may be formed from a sheet of copper, provides a template for producing the variety of shapes 12. The outer surface of each sidewall 11 is coated with a first layer 20 of mirror-backing paint with the exception of the surface area which is to be transparent and which is covered by the mask. The outer surface of each sidewall 11 has a second layer 20 of dark paint placed onto the first layer 20.

The method of manufacturing the preferred embodiment of the present invention includes the steps of: (1) providing six identical squares of glass or some other transparent material; (2) placing a set of copper templates on each of the squares of glass; (3) coating the side of each square having the copper templates placed thereon with a layer of mirror-backing paint; (4) coating this layer of mirror-backing paint with a layer of dark paint; (5) removing the copper templates; (6) coating some of the transparent area with a stain glass paint; and (7) assembling the six squares into a cube with the mirrored surface of each forming the inner surface.

The inventors have specifically disclosed a cube, they have found that other polygons, including a hexagon, will also function in the same manner as the cube does, although each polygon will provide its own optical effect.

Figure 4:
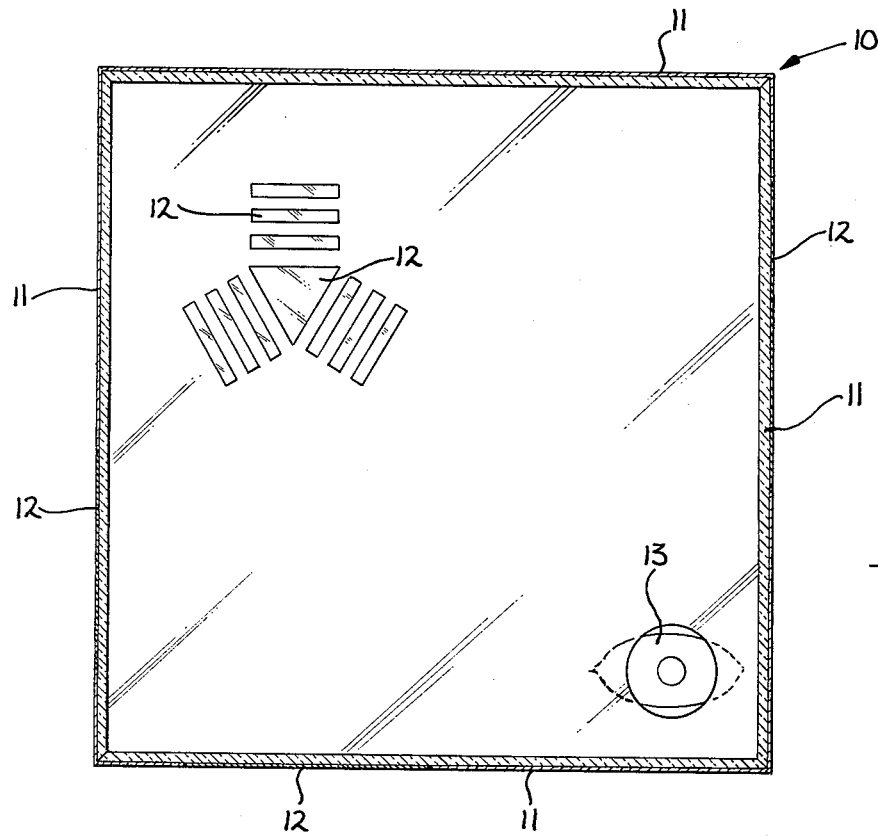
FIG. 4 is a side elevational, cross-sectional view of the kaleidoscopic toy of FIG. 1 taken along the line 4—4 of FIG. 3.

Referring to FIG. 3 and FIG. 4 in conjunction with FIG. 1 and FIG. 2 the variety of shapes 12 may be mixed up to form any number of combinations. The viewing window 13 enables a person to look into the kaleidoscopic toy 10 and enjoy a reproduceable optical effect. The size of this toy 10 is irrelevant, but the larger the toy 10 is, the clearer and sharper the mirrored images are.

From the foregoing it can be seen that an improved kaleidoscopic toy has been described. The toy provides a plurality of reproduceable optical shapes and patterns and and may be manufactured in variety of sizes. The optical shapes and pattern may be selected from an infinite plurality of optical shapes and patterns. The toy is also a safe toy for children, particularly if its sidewalls are formed from a transparent plastic.

Accordingly it is intended that the foregoing disclosure and showing made in the drawing shall be considered only as an illustration of the present invention. Furthermore, it should be noted that the sketches are not drawn to scale and that distances of and between the various figures are not to be considered significant. The invention will be set forth with particularity in the appended claims.

What is claimed is:

1. An improved kaleidoscopic toy which has no moving parts and which provides a plurality of reproduceable mult-colored optical shapes and patterns comprising:
   a. a polygon having a plurality of inner sidewalls, each of said inner sidewalls having a mirrored surface with a plurality of transparent areas, each of which is in a particular shape and which is colored with a stain glass paint of any one of a variety of colors; and
   b. means for viewing each of said mirrored surfaces of said inner sidewalls whereby an individual viewer may view a combination of oppositely disposed said inner sidewalls so that said colored transparent areas on each of said oppositely disposed inner sidewalls combines to form a unique optical pattern.

2. An improved kaleidoscopic toy according to claim 1 wherein said means for viewing is a small transparent hole in the mirrored surface adjacent to the corner of one of said plurality of inner sidewalls.

3. An improved kaleidoscopic toy according to claim 1 wherein said improved kaleidoscopic toy is a cube having six inner sidewalls each of which comprises:
   a. a flat, square-shaped member formed from a transparent material;
   b. a first layer of mirror backing paint interrupted only by said plurality of transparent areas of the mirrored surface is disposed on each outer sidewall of said cube; and
   c. a second layer of dark paint is disposed over said first layer.

4. An improved kaleidoscopic toy according to claim 3 wherein said transparent materials is glass.

5. An improved kaleidoscopic toy according to claim 3 wherein said transparent material is plastic.

6. A method for manufacturing a kaleidoscopic toy which has no moving parts and which provides a plurality of reproduceable multi-colored optical shapes and patterns comprising the steps of:
   a. forming six identical flat, square-shaped members from a transparent material;
   b. using a plurality of flat members in various shapes to form a painting mask in order to provide transparent areas;
   c. coating the outer surface of each of said six identical flat, square-shaped members with a first layer of mirror backing paint;
   d. coating said first layer with a second layer of dark paint;
   e. coating said transparent areas with stain glass paint of any one of a variety of colors; and
   f. assembling said six identical flat, square-shaped members into a cube.

* * * * *